Patented Mar. 6, 1951

2,543,964

UNITED STATES PATENT OFFICE 2,543,964

MINERAL OIL COMPOSITIONS CONTAINING COPOLYMERS OF OLEFINS AND ESTERS OF ALPHA,BETA-UNSATURATED POLYBASIC ACIDS

John J. Giammaria, Woodbury, N. J., assignor to Socony-Vacuum Oil Company, Incorporated, a corporation of New York No Drawing. Application July 9, 1947,
Serial No. 759,906

12 Claims. (Cl. 252—56)

This invention relates to improved oil compositions. More particularly it relates to lubricating oil compositions improved as to their pour points by the addition thereto of minor proportions, sufficient to substantially lower the pour points thereof, of certain polymers of olefins or mixtures of olefins, with esters or mixtures of esters, of alpha, beta-unsaturated polybasic acids.

A copolymer formed from ethylene and the dodecyl ester of fumaric acid is described in United States Letters Patent 2,327,705, granted August 24, 1943 to Per K. Frolich et al. This copolymer is mentioned among a number of other compositions as being useful for improving the viscosity index of lubricating oil. It is not mentioned as, nor has it been found, useful for improving the pour point of lubricating oil.

The copolymers of the present invention are, like the copolymer of Frolich et al., derived from olefins and esters of alpha, beta-unsaturated polybasic acids. They differ, however, in that the compounds from which they are prepared contain a greater number of carbon atoms than do the compounds from which Frolich et al. prepare their copolymer. As a consequence, the copolymers of this invention are particularly effective as pour point depressants, whereas the copolymer of Frolich et al. has little or no effectiveness for this purpose.

The copolymers of the present invention can be prepared either from pure chemical compounds or from mixtures of chemical compounds. Thus, the ester may be prepared from a single alpha, beta-unsaturated polybasic acid or anhydride or from a mixture of alpha, beta-unsaturated polybasic acids or anhydrides. These may be reacted to from the ester with a single, chemically pure alcohol, or with a mixture of alcohols such as are commonly sold as "technical" alcohols. Once the ester has been formed it may be reacted either with a single chemically pure olefin or with a mixture of olefins.

In preparing the esters to be later used in the preparation of the copolymers of the present invention any alpha, beta-unsaturated polybasic acid or anhydride, or any mixture thereof may be used. The preferred members of this class are maleic, fumaric, itaconic, citraconic, glutaconic, mesaconic and aconitic. Maleic and fumaric will generally be used because of their lower cost and availability.

These polybasic acids or anhydrides are reacted to form esters with alcohols which are, preferably, normal, straight chained, primary alcohols. When a single alcohol is used for this purpose it must contain at least fourteen carbon atoms. When mixtures of alcohols are used, a substantial proportion, say at least 25% of the alcohols in the mixture (by weight), must contain at least fourteen carbon atoms. There is one exception to this rule and that is where the olefin material contains at least four and preferably eight or more carbon atoms, in which case the alcohol radicals of the ester may contain as few as twelve or perhaps even fewer carbon atoms.

The upper limit to the number of carbon atoms in the alcohol or mixture of alcohols does not appear to be particularly critical but it is preferred that the number of carbon atoms, or the average number of carbon atoms in the case of a mixture of alcohols, not exceed twenty.

Since the formation of esters is well known it will immediately be apparent to those skilled in the art that the esters specified above may be prepared by any known method, either from the alcohols and acids or anhydrides specified above or from any other starting materials from which esters of the same type can be prepared by known methods.

Usually an alcohol or mixture of alcohols will be reacted with an alpha, beta-unsaturated polybasic acid or anhydride or a mixture of such acids or anhydrides in accordance with one of the well known processes for forming carboxylic acid esters. Preferably an excess of the alcohol or mixture of alcohols will be caused to be present in the reaction zone and conditions will be maintained such as will produce a diester.

In forming the copolymer from the ester and olefin materials, it is preferred to use an olefin or a mixture of olefins containing an average of at least four carbon atoms per molecule. Olefins containing an average of as many as thirty carbon atoms per molecule may be used. Preferably the olefins are wholly or largely of the monoolefin straight chain variety with the double bonds in the alpha position. Olefins containing as few as two carbon atoms (ethylene) can be used, but are generally not considered as satisfactory for the purposes of this invention.

The diester, after production may be reacted with the olefin or mixture of olefins by simple heating in the presence of a small amount of benzoyl peroxide or other similarly acting catalyst. In this reaction, it has been found preferable to utilize an excess of the olefin and to remove any unreacted excess after the copolymerization is completed.

The resultant copolymer is an oil-soluble product that exhibits a marked depressant effect upon the pour point of lubricating oil in which it is incorporated.

Preferably the copolymerization is conducted at a temperature of around 100° F. to 150° F. Apparently the reaction can be conducted at temperatures as low as 75° F. and as high as 200° F. although at the lower temperature the reaction proceeds too slowly to be commercially practicable and at the higher temperature some conversion of the reactants into undesirable side products occurs.

Any pressure may be used, although, when gaseous or low-boiling olefins are utilized, it is preferred to employ pressures from 100 to 1000 pounds per square inch. Catalysts such as benzoyl peroxide, acetyl-benzoyl, lauroyl peroxide, and the like, in proportions of around 1% have been found satisfactory. Depending upon the reactants, conditions and the catalysts used, the reaction will complete itself in from 15 minutes to 20 hours. The copolymerization may be effected in emulsion or suspension according to standard well known procedures.

The ratio of ester material to olefin material may be varied throughout wide limits. Thus one mol of olefin may be reacted with 0.1 to about 5 mols of ester to form products of varying characteristics. With a higher molecular weight olefin such as octene-1, valuable products are obtained when 1 mol of olefin is copolymerized with 0.5 to 3.0 mols of the ester.

A more complete understanding of the advantages and details of this invention will be apparent from a consideration of the following specific examples.

Example I

A diester of maleic acid was prepared from maleic anhydride and a technical grade of lauryl alcohol obtained from Eastman Kodak Company. 25.0 g. of this ester, 100.0 g. of isobutylene, and 0.5 g. of benzoyl peroxide were heated slowly in a Monel-lined autoclave to 100° C. and held there for two hours. The product was allowed to cool and the excess isobutylene distilled off. The product was a viscous light-colored oil.

Example II 25 g. of ditetradecyl fumarate was dissolved in 100 cc. of xylene, 25 g. of isobutylene and 0.5 g. of benzoyl peroxide added, and the mixture heated in a Monel lined autoclave to 100° C. and held for three hours. The product, after cooling and removing the unreacted isobutylene, was a viscous oil.

Example III 30 g. of di"Lorol-B" fumarate were dissolved in 400 cc. of xylene and 0.5 g. of benzoyl peroxide added and the mixture placed in a stainless steel autoclave. The ester was obtained through the use of a mixture of alcohols known as "Lorol-B." This mixture consists of alcohols of from ten to eighteen carbon atoms in about the following proportions:

| | Percent |
|---|---|
| $C_{10}$ alcohols | 2.5 |
| $C_{12}$ alcohols | 55.0 |
| $C_{14}$ alcohols | 20.5 |
| $C_{16}$ alcohols | 9.0 |
| $C_{18}$ alcohols | 13.0 |

It is marketed by the E. I. du Pont de Nemours and Company, of Wilmington, Delaware, under the trade name of "Lorol-B."

Ethylene was introduced until a pressure of 700 pounds per square inch was reached. The temperature was then raised to 100° C. and held for 3 hours. After cooling and releasing the unreacted ethylene the product was recovered as a viscous oil.

Example IV 45.0 g. of di"Lorol-B" fumarate, 11.2 of octene-1 and 0.56 g. of benzoyl peroxide were slowly heated, while stirring, to 100° C. This temperature was held for about 3 hours, after which the temperature was raised to 125° C. and held for an additional hour. Unreacted octene-1 was then distilled off yielding a viscous, oily copolymer.

Example V 5.08 g. of ditetradecyl fumarate, 1.12 g. of octene-1 and 0.1 g. of benzoyl peroxide were heated at 80° C. for 16 hours in a sealed tube.

Example VI 4.7 g. of didodecyl fumarate prepared from dodecanol-1, 2.52 g. of octadecene-1 and 0.1 g. of benzoyl peroxide were heated in a sealed tube at 80° C. for 16 hours.

Example VII 25 g. of didodecyl fumarate were reacted with ethylene in accordance with the procedure described in Example III.

The effects of the copolymers prepared according to Examples I to VII, as pour point depressants, are illustrated in Table I. The results were obtained using a Mid-Continent type base oil having a kinematic viscosity of 12.2 centistokes at 210° F. and an ASTM pour point of +20° F.

TABLE I

| Compound Blended In Oil | Concentration, Weight Per Cent | A. S. T. M. Pour Point, ° F. |
|---|---|---|
| Copolymer from Example I | 1.0 | −5 |
| Copolymer from Example II | 0.125 | −25 |
| Copolymer from Example II | 0.062 | −15 |
| Copolymer from Example III | 1.0 | −20 |
| Copolymer from Example IV | 0.125 | −25 |
| Copolymer from Example IV | 0.062 | −15 |
| Copolymer from Example V | 0.125 | −15 |
| Copolymer from Example V | 0.062 | −15 |
| Copolymer from Example VI | 0.125 | −15 |
| Copolymer from Example VI | 0.062 | −15 |
| Copolymer from Example VII | 1.0 | +20 |

Example VII, which proved to be inoperative was performed for the purpose of determining and indicating the limits of the present invention.

From the above table it will be immediately apparent that all of the compounds of Examples I to VI are effective as pour point depressants, but that the compounds of Examples I and III are, by comparsion with the compounds of the other examples, much less desirable.

It will be noted, for example, that the compound of Example II when added to mineral oil in a proportion of only one-sixteenth of 1% reduced the pour point of that oil to −15° F. whereas the product of Example I when added in the proportion of 1% only reduced the pour point to −5° F. Thus, the product of Example II is more than sixteen times as effective as a pour point depressant.

The product of Example III is similar to the product of Example IV except that the ester was polymerized with ethylene in Example III and with octene-1 in Example IV. Again, the effectiveness was increased nearly sixteen times by the use of the longer chained olefin molecule.

Esters of maleic and fumaric acid have been shown to be satisfactory by the foregoing examples and experience with other alpha, beta-unsaturated polybasic acids indicates that esters of any of these acids will also be satisfactory.

Olefins having not less than eight nor more than eighteen carbon atoms are definitely indicated to be particularly satisfactory by the foregoing examples and olefins having a larger number of carbon atoms per molecule are believed also to be usable. However, olefins having appreciably less than eight carbon atoms per molecule as for example ethylene and isobutylene are shown to be operative though not as satisfactory.

Any proportion of the copolymers necessary to effect the desired improvement in the pour point of a lubricating composition may be incorporated in such a composition. Normally the lubricating oil composition in which the copolymers of this invention will be incorporated will be a mineral lubricating oil of the type used in the lubrication of internal combustion engines and the like. Such a lubricating oil may be either a natural oil or a synthetically prepared oil, and may contain other pour point depressants in addition to the copolymers of this invention or other addition agents for the purpose of improving the viscosity index, the stability, or any of the other characteristics. Ordinarily, the copolymers of this invention will be incorporated in such compositions in proportions ranging from 0.01% to 2% of the entire composition. In certain instances proportions as low as 0.005% may be sufficient and, in other instances, proportions as high as 10% may be found desirable.

Instead of adding the copolymers of this invention directly to the lubricating oil, they may be marketed as concentrates, i. e., mineral lubricating oils containing upwards of 10% of the copolymers and as high as 50%. These concentrates can be incorporated in mineral lubricating oil compositions, which may or may not contain other addition agents, in amounts to produce the desired concentration of copolymer therein.

What is claimed is:

1. A lubricant composition comprising a major proportion of a lubricating oil and a minor proportion, sufficient to substantially lower the pour point thereof, of a copolymer formed by reacting an aliphatic mono-olefin hydrocarbon having the double bond in the alpha position and having up to about 30 carbon atoms and an alkyl diester of an alpha, beta-unsaturated dicarboxylic acid in which the ester radicals are straight-chain and contain at least 14 carbon atoms and no more than about 20 carbon atoms per radical, in the proportions of 1 mol of the olefin to from about 0.1 to about 5 mols of the diester, at a temperature between about 75° F. and about 200° F. for a period of time between about fifteen minutes and about twenty hours and in the presence of a peroxide polymerization catalyst.

2. A lubricant composition comprising a major proportion of a lubricating oil and a minor proportion, sufficient to substantially lower the pour point thereof, of a copolymer formed by reacting an aliphatic mono-olefin hydrocarbon having the double bond in the alpha position and having up to about 30 carbon atoms and an alkyl diester of an alpha, beta-unsaturated dicarboxylic acid in which the ester radicals are straight-chain and contain an average of about 14 carbon atoms per radical, in the proportions of 1 mol of the olefin to from about 0.1 to about 5 mols of the diester, at a temperature between about 75° F. and about 200° F. for a period of time between about fifteen minutes and about twenty hours in the presence of a peroxide polymerization catalyst.

3. A lubricant composition comprising a major proportion of a lubricating oil and a minor proportion, sufficient to substantially lower the pour point thereof, of a copolymer formed by reacting an aliphatic mono-olefin hydrocarbon having the double bond in the alpha position and having up to about 30 carbon atoms and an alkyl diester of an alpha, beta-unsaturated dicarboxylic acid in which the ester radicals are straight-chain and contain about 14 carbon atoms per radical, in the proportions of 1 mol of the olefin to from about 0.1 to about 5 mols of the diester, at a temperature between about 75° F. and about 200° F. for a period of time between about fifteen minutes and 20 hours in the presence of a peroxide polymerization catalyst.

4. A lubricant composition comprising a major proportion of a lubricating oil and a minor proportion, sufficient to substantially lower the pour point thereof, of a copolymer formed by reacting an aliphatic mono-olefin hydrocarbon having the double bond in the alpha position and having at least 4 and up to about 30 carbon atoms and an alkyl diester of an alpha, beta-unsaturated dicarboxylic acid in which the ester radicals are straight-chain and contain at least 12 carbon atoms and no more than about 20 carbon atoms per radical, in the proportions of 1 mol of the olefin to from about 0.1 to about 5 mols of the diester, at a temperature between about 75° F. and 200° F. for a period of time between about fifteen minutes and twenty hours and in the presence of a peroxide polymerization catalyst.

5. A lubricant composition comprising a major proportion of a lubricating oil and a minor proportion, sufficient to substantially lower the pour point thereof, of a copolymer formed by reacting an aliphatic mono-olefin hydrocarbon having the double bond in the alpha position and having at least 4 and up to about 30 carbon atoms and an alkyl diester of an alpha, beta-unsaturated dicarboxylic acid in which the ester radicals are straight-chain and contain an average of about 14 carbon atoms per radical, in the proportions of about one mol of the olefin to from about 0.1 to about 5 mols of the diester, at a temperature of between about 75° F. and 200° F. for a period of time between about fifteen minutes and twenty hours and in the presence of a peroxide polymerization catalyst.

6. A lubricant composition comprising a major proportion of a lubricating oil and a minor proportion, sufficient to substantially lower the pour point thereof, of a copolymer formed by reacting an aliphatic mono-olefin hydrocarbon having the double bond in the alpha position and having at least 4 and up to about 30 carbon atoms and an alkyl diester of an alpha, beta-unsaturated dicarboxylic acid in which the ester radicals are straight-chain and contain about 14 carbon atoms per radical, in the proportions of 1 mol of the olefin to from about 0.1 to about 5 mols of the diester, at a temperature of between about 75° F. and about 200° F. for a period of time between about fifteen minutes and about twenty hours and in the presence of a perioxide polymerization catalyst.

7. A lubricant composition comprising a major proportion of a lubricating oil and a minor proportion, sufficient to substantially lower the pour point thereof, of an aliphatic monoolefin hydrocarbon having the double bond in the alpha position and having at least 8 and up to about 30 carbon atoms and an alkyl diester of an alpha, beta-unsaturated dicarboxylic acid in which the ester radicals are straight-chain and contain at least 12 carbon atoms and no more than about 20 carbon atoms per radical, in the proportions of 1 mol of the olefin to from about 0.1 to about 5 mols of the diester, at a temperature of between about 75° F. and about 200° F. for a period of time between about fifteen minutes and about twenty hours and in the presence of a peroxide polymerization catalyst.

8. A lubricant composition comprising a major proportion of a lubricating oil and a minor proportion, sufficient to substantially lower the pour point thereof, of a copolymer formed by reacting an aliphatic mono-olefin hydrocarbon having the double bond in the alpha position and having at least 8 and up to about 30 carbon atoms and an alkyl diester of an alpha, beta-unsaturated dicarboxylic acid in which the ester radicals are straight-chain and contain an average of about 14 carbon atoms per radical, in the proportions of 1 mol of the olefin to from about 0.1 to about 5 mols of the diester, at a temperature of between about 75° F. and about 200° F. for a period of time between about fifteen minutes and about twenty hours and in the presence of a peroxide polymerization catalyst.

9. A lubricant composition comprising a major proportion of a lubricating oil and a minor proportion, sufficient to substantially lower the pour point thereof, of a copolymer formed by reacting an aliphatic mono-olefin hydrocarbon having the double bond in the alpha position and having at least 8 and up to about 30 carbon atoms and an alkyl diester of an alpha, beta-unsaturated dicarboxylic acid in which the ester radicals are straight-chain and contain about 14 carbon atoms per radical, in the proportions of 1 mol of the olefin to from about 0.1 to about 5 mols of the diester, at a temperature of between about 75° F. and about 200° F. for a period of time between about fifteen minutes and about twenty hours and in the presence of a peroxide polymerization catalyst.

10. A lubricant composition comprising a major proportion of a lubricating oil and a minor proportion, sufficient to substantially lower the pour point thereof, of a copolymer formed by reacting isobutylene and tetradecyl fumarate, in the proportions of 1 mol of the olefin to from about 0.1 to about 5 mols of the diester, at a temperature of between about 75° F. and about 200° F. for a period of time between about fifteen minutes and about twenty hours and in the presence of a peroxide polymerization catalyst.

11. A lubricant composition comprising a major proportion of a lubricating oil and a minor proportion, sufficient to substantially lower the pour point thereof, of a copolymer formed by reacting octene-1 and an alkyl diester of fumaric acid, the ester radicals of which are derived from a mixture of straight-chain alcohols having an average of about 14 carbon atoms per molecule, in the proportions of 1 mol of the olefin to from about 0.1 to about 5 mols of the diester, at a temperature of between about 75° F. and about 200° F. for a period of time between about fifteen minutes and about twenty hours and in the presence of a peroxide polymerization catalyst.

12. A lubricant composition comprising a major proportion of a lubricating oil and a minor proportion, sufficient to substantially lower the pour point thereof, of a copolymer formed by reacting octene-1 and an alkyl diester of maleic acid, the ester radicals of which are derived from a mixture of straight-chain alcohols having an average of about 14 carbon atoms per molecule, in the proportions of 1 mol of the olefin to from about 0.1 to about 5 mols of the diester, at a temperature of between about 75° F. and about 200° F. for a period of time between about fifteen minutes and about twenty hours and in the presence of a peroxide polymerization catalyst.

JOHN J. GIAMMARIA.

REFERENCES CITED

The following references are of record in the file of this patent:

UNITED STATES PATENTS

| Number | Name | Date |
|---|---|---|
| 2,327,705 | Frolich | Aug. 24, 1943 |
| 2,366,517 | Gleason | Jan. 2, 1945 |
| 2,380,304 | Gleason | July 10, 1945 |
| 2,422,887 | Blair, Jr. | June 24, 1947 |